(12) United States Patent
Yoo

(10) Patent No.: US 11,470,952 B2
(45) Date of Patent: *Oct. 18, 2022

(54) FINGER GRIP FOR SMART DEVICE

(71) Applicant: Hyun Joo Yoo, Siheung (KR)

(72) Inventor: Hyun Joo Yoo, Siheung (KR)

(73) Assignee: MOMOSTICK CO., LTD., Incheon (KR)

(*) Notice: Subject to any disclaimer, the term of this patent is extended or adjusted under 35 U.S.C. 154(b) by 674 days.

This patent is subject to a terminal disclaimer.

(21) Appl. No.: 16/428,992

(22) Filed: Jun. 1, 2019

(65) Prior Publication Data

US 2019/0281965 A1    Sep. 19, 2019

Related U.S. Application Data

(62) Division of application No. 16/012,984, filed on Jun. 20, 2018, now Pat. No. 10,349,728.

(30) Foreign Application Priority Data

Sep. 26, 2017   (KR) .................. 10-2017-0124612

(51) Int. Cl.
*A45F 5/10* (2006.01)
*H04M 1/04* (2006.01)
*H04B 1/3827* (2015.01)

(52) U.S. Cl.
CPC .............. *A45F 5/10* (2013.01); *H04M 1/04* (2013.01); *A45F 2005/1093* (2013.01); *A45F 2200/0516* (2013.01); *H04B 2001/3861* (2013.01)

(58) Field of Classification Search
CPC ............. A45F 5/10; A45F 2200/0516; A45F 2200/0525; A45F 2005/1093; H04B 1/3888; H04B 2001/3861; H04M 1/0281
See application file for complete search history.

(56) References Cited

U.S. PATENT DOCUMENTS 8,374,657 B2 *  2/2013  Interdonato ............ H04B 1/385
                                                         455/344
8,523,031 B2 *  9/2013  Hedrick ..................... A45F 5/00
                                                         224/257

(Continued)

FOREIGN PATENT DOCUMENTS

KR  10 2014 0134071  *  11/2014
KR  10 1705819       *  2/2017

(Continued)

*Primary Examiner* — Dean J Kramer
(74) *Attorney, Agent, or Firm* — Patent Office of Dr. Chung Park

(57) ABSTRACT

The present invention relates to a finger grip for a smart device, including: a bonding sheet having a bonding surface attached to one side of an outer surface of the smart device; a guide sheet coupled to one side surface of the bonding sheet and having a guide slot formed on one side thereof and a coupling groove formed on the other side thereof; a variable sheet laminated on one side surface of the guide sheet and having a fusion portion formed correspondingly to the coupling groove and a slide pin formed protrudingly therefrom to pass through the guide slot; a fixing rivet coupled to the slide pin of the variable sheet to prevent the slide pin from escaping from the guide slot; and a printed film coupled to one side surface of the variable sheet.

4 Claims, 10 Drawing Sheets

(56) References Cited

U.S. PATENT DOCUMENTS

| | | | | |
|---|---|---|---|---|
| 8,550,317 | B2* | 10/2013 | Hyseni | A45F 5/00 |
| | | | | 224/217 |
| 9,362,968 | B1* | 6/2016 | Haymond | H04M 1/0281 |
| 10,063,272 | B1* | 8/2018 | Yeo | A45F 5/00 |
| 10,349,728 | B2* | 7/2019 | Yoo | H04M 1/04 |
| 2011/0309117 | A1* | 12/2011 | Roberts | H04M 1/04 |
| | | | | 224/217 |
| 2014/0084034 | A1* | 3/2014 | Wangercyn, Jr. | A45F 5/00 |
| | | | | 224/217 |
| 2015/0092346 | A1* | 4/2015 | Ben | G06F 1/1626 |
| | | | | 248/688 |
| 2016/0069512 | A1* | 3/2016 | Grieve | F16M 13/06 |
| | | | | 294/142 |
| 2016/0088924 | A1* | 3/2016 | Haymond | A45F 5/00 |
| | | | | 224/218 |
| 2016/0134733 | A1* | 5/2016 | Murphy | A45F 5/00 |
| | | | | 455/575.6 |
| 2016/0233909 | A1* | 8/2016 | West | H04B 1/385 |
| 2016/0286016 | A1* | 9/2016 | Lee | H04M 1/04 |
| 2017/0328514 | A1* | 11/2017 | Cavalcante | F16M 13/00 |
| 2019/0055062 | A1* | 2/2019 | Winn | H04B 1/3888 |

FOREIGN PATENT DOCUMENTS

| | | | | |
|---|---|---|---|---|
| KR | 10 2017 0083333 | * | 7/2017 | |
| WO | WO-2017069471 A1 | * | 4/2017 | H04M 1/04 |

* cited by examiner

FINGER GRIP FOR SMART DEVICE

CROSS REFERENCE TO RELATED APPLICATION OF THE INVENTION

This application is a divisional application of U.S. patent application Ser. No. 16/012,984, filed on Jun. 20, 2018, which claims the benefit of Korean Patent Application No. 10-2017-0124612 filed in the Korean Intellectual Property Office on Sep. 26, 2017, the entire contents of which are incorporated herein by reference.

BACKGROUND OF THE INVENTION

Field of the Invention

The present invention relates to a finger grip for a smart device, and more particularly, to a finger grip for a smart device that is attached to one side of an outer surface of the smart device in such a manner as to be fitted to a user's finger to allow the smart device to be more stably held by the user's finger, so that while the smart device is being used by the user, his or her hands become free.

Background of the Related Art

As the applications of mobile devices like smart phones to social lives have been increasingly widened, currently, the frequency of their usage has become gradually increased, and if a smart phone is held by a user's hands for long hours, accordingly, a given load is absolutely applied to the user.

Particularly, sizes of display screens for the smart phones recently sold are increased to satisfy demands of users, and accordingly, users who have relatively small hands have to be especially careful while they are using their smart phone.

When the smart phone is used at a given place, for example, when navigation of the smart phone is used during the smart phone user drives his or her car, the user's both hands are not free, which causes safety accidents. As technologies on an operating system and a touch screen for the smart phone have been developed, besides, a size of the touch screen is increased, so that it is a little hard to manipulate the touch screen only by the user's one hand. Further, it is extremely hard for women who have small hands and people who use their smart phone before falls asleep to manipulate the smart phone only by their one hand, and accordingly, they may fall down their smart phone, which causes the smart phone to be damaged or even broken.

So as to solve the above-mentioned problems, a mounting stand for a smart phone is disclosed in Korean Patent Application Laid-open No. 10-2016-0006733, but the conventional mounting stand just functions to mount the smart phone on an arbitrary place, thereby still making it inconvenient in manipulating the smart phone on the user's hands.

SUMMARY OF THE INVENTION

Accordingly, the present invention has been made in view of the above-mentioned problems occurring in the prior art, and it is an object of the present invention to provide a finger grip for a smart device that is capable of more stably holding the smart device through a variable sheet fitted to a user's finger and also adjusting the variable sheet's size by means of a plurality of protrusions formed on the guide sheet according to the user's finger thickness.

It is another object of the present invention to provide a finger grip for a smart device that can be made by means of heat fusion, without any separate adhesive, so that the finger grip does not give any harm to the human body, bonding forces among components are improved to minimize damage or deformation of a product, and a manufacturing process is simplified to improve productivity and economical effects.

It is yet another object of the present invention to provide a finger grip for a smart device that is capable of maintaining a fixed state of a variable sheet by means of protrusion portions to allow the smart device to be mounted on an arbitrary place and also adjusting an angle of the smart device mounted on the arbitrary place through the adjustment of the variable sheet.

It is still another object of the present invention to provide a finger grip for a smart device that is capable of rotating a guide sheet so that in the state where the smart device is held by a user, the smart device can rotate freely.

To accomplish the above-mentioned objects, according to the present invention, there is provided a finger grip for a smart device including: a bonding sheet having a bonding surface attached to one side of an outer surface of the smart device, the bonding surface having a punched portion formed on one side of a top surface thereof, and a protection film for protecting the bonding surface; a guide sheet coupled to one side surface of the bonding sheet and having a guide slot formed on one side thereof and a coupling groove formed on the other side thereof; a variable sheet laminated on one side surface of the guide sheet and having a fusion portion formed correspondingly to the coupling groove and a slide pin formed protrudingly therefrom to pass through the guide slot; a fixing rivet coupled to the slide pin of the variable sheet to prevent the slide pin from escaping from the guide slot; and a printed film coupled to one side surface of the variable sheet, wherein the guide slot of the guide sheet includes at least one or more protruding portions protruding inwardly therefrom to fix the slide pin in position thereto, while the slide pin is reciprocatedly moving therealong, and an auxiliary groove adapted to seat a head of the fixing rivet thereonto to prevent the head from protruding outwardly therefrom, and the protruding portions having first protrusions formed on the outside of the guide slot with respect to a center of the guide sheet in such a manner as to be symmetrical to each other on both sides of the inner peripheral surface of the guide slot to allow the variable sheet to be kept in the state of coming into close contact with the guide sheet.

According to the present invention, desirably, the protruding portions have a plurality of second protrusions spaced apart from each other by a given distance on one side of the inner peripheral surface of the guide slot in the opposite direction to the first protrusions to allow the variable sheet to be kept in the state of being spaced apart from the guide sheet, while the spaced distance is being step by step adjusted.

According to the present invention, desirably, the coupling groove includes a concave-convex portion formed on the surface thereof so that the coupling groove is firmly fixed to the fusion portion.

According to the present invention, desirably, the bonding sheet, the guide sheet, the variable sheet, and the fixing rivet are coupled to one another by means of any one selected from heat fusion, ultrasonic fusion, and bonding.

According to the present invention, desirably, the guide sheet includes at least one or more fixing members made of a magnetic material so that the smart device is attached to a predetermined position.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
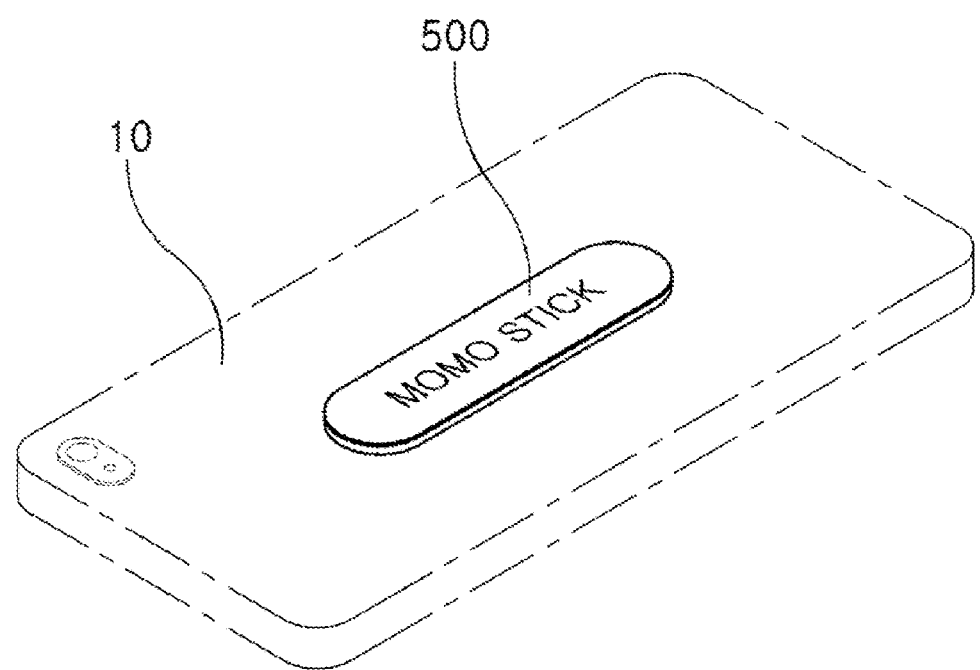
FIG. 1 is a perspective view showing a use state of a finger grip for a smart device according to a first embodiment of the present invention.

Now, the present invention is disclosed with reference to the attached drawings wherein the corresponding parts in the embodiments of the present invention are indicated by corresponding reference numerals and the repeated explanation on the corresponding parts will be avoided. If it is determined that the detailed explanation on the well known technology related to the present invention makes the scope of the present invention not clear, the explanation will be avoided for the brevity of the description.

Figure 2:
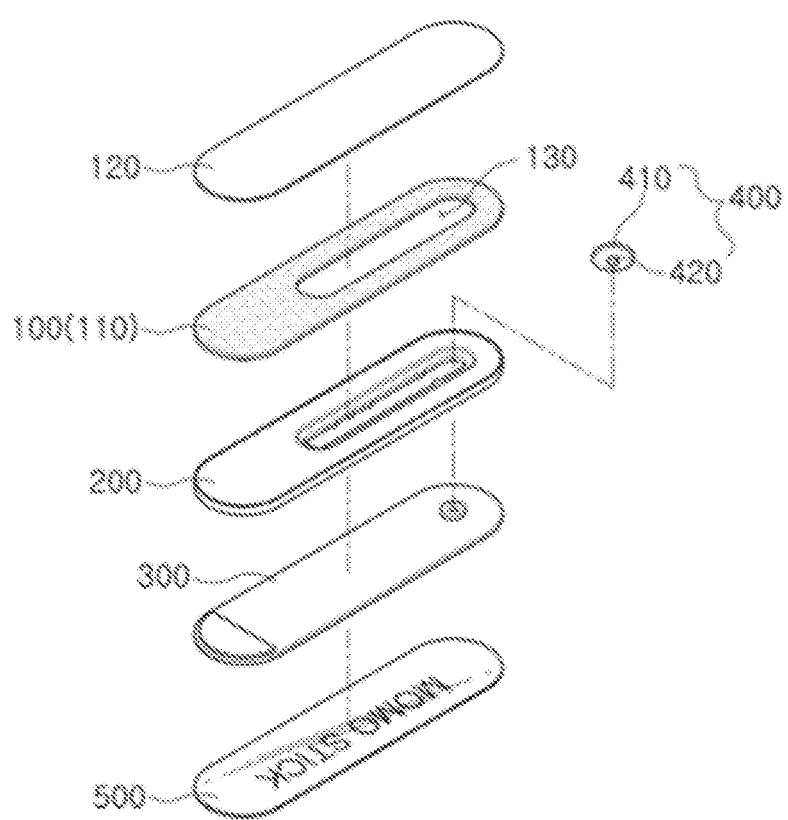
FIG. 2 is an exploded perspective view showing the finger grip for a smart device according to the first embodiment of the present invention.
Figure 3:
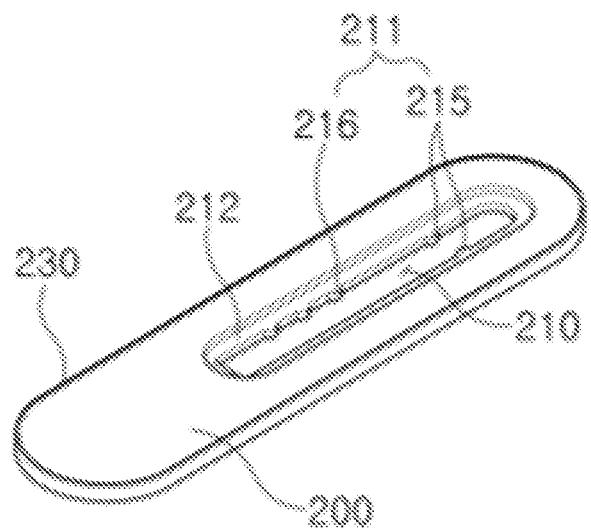
FIG. 3 is a perspective view showing a guide sheet of the finger grip according to the first embodiment of the present invention.
Figure 4:
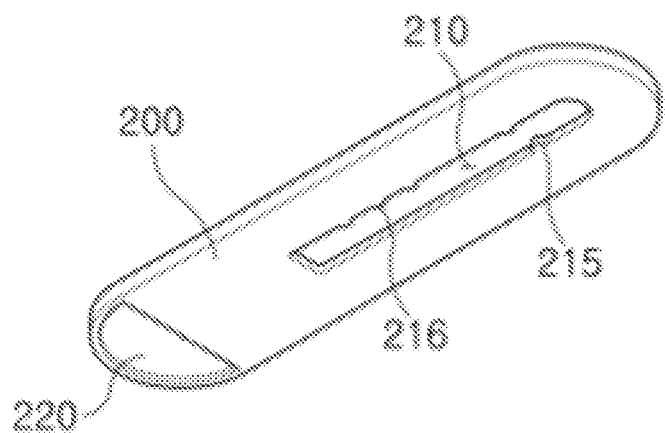
FIG. 4 is a perspective view showing an underside of the guide sheet of FIG. 3.
Figure 5:
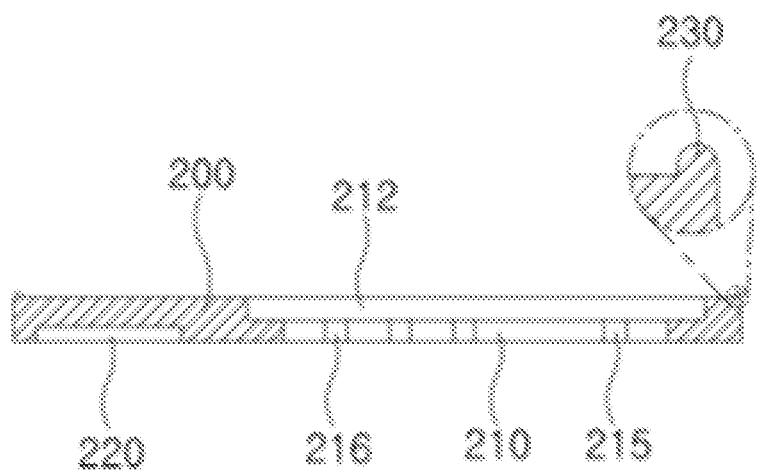
FIG. 5 is a schematic sectional view showing the guide sheet according to the first embodiment of the present invention.
Figure 6:
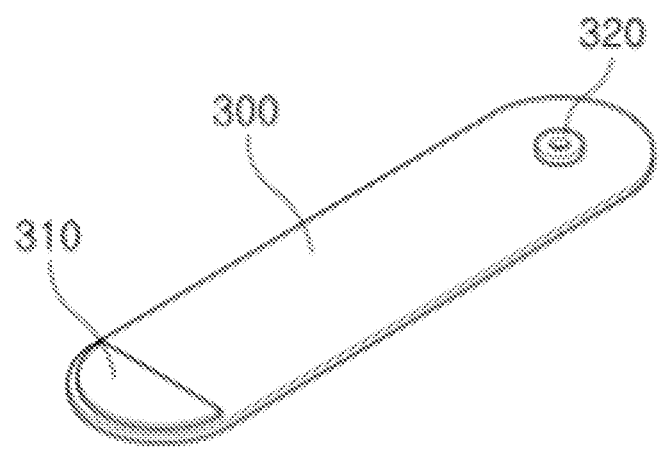
FIG. 6 is a perspective view showing a variable sheet of the finger grip according to the first embodiment of the present invention.
Figure 7A:
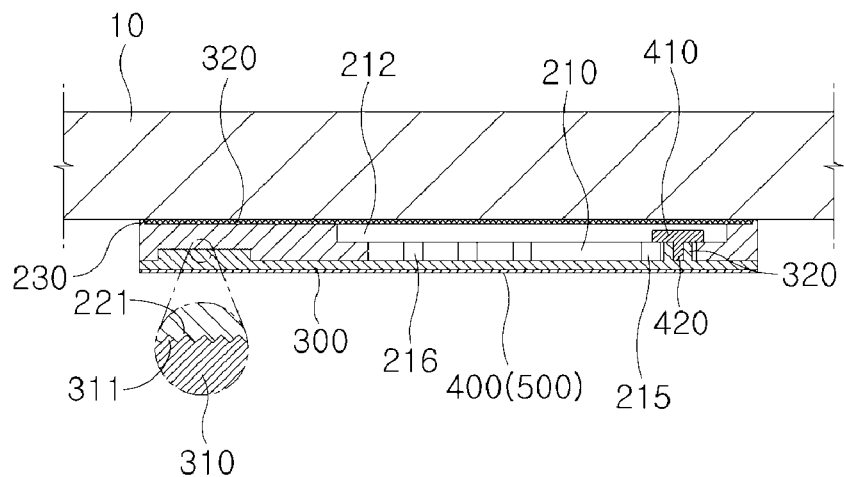
FIGS. 7a to 7c are schematic sectional views showing the use state of the finger grip according to the first embodiment of the present invention.
Figure 7B:
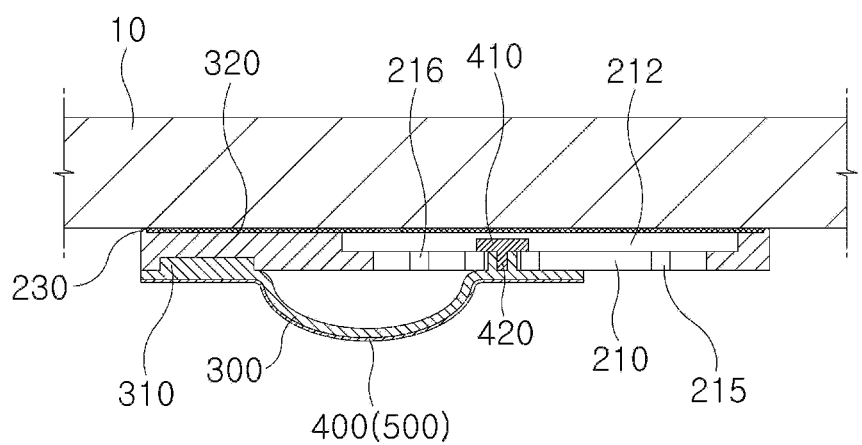
Figure 7C:
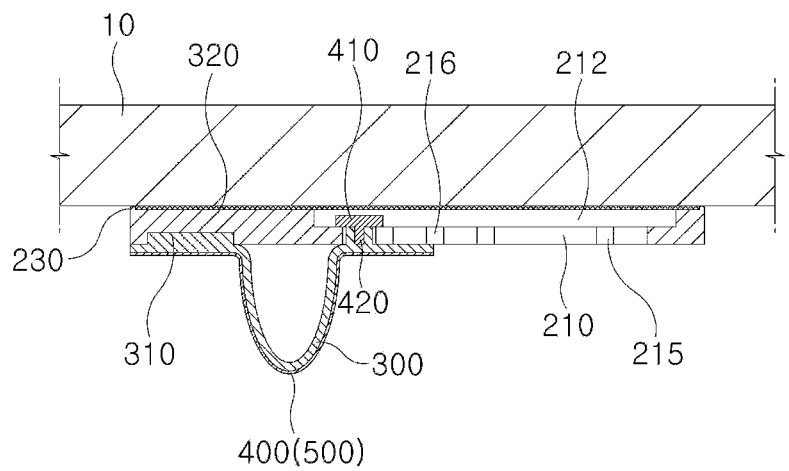
Figure 8:
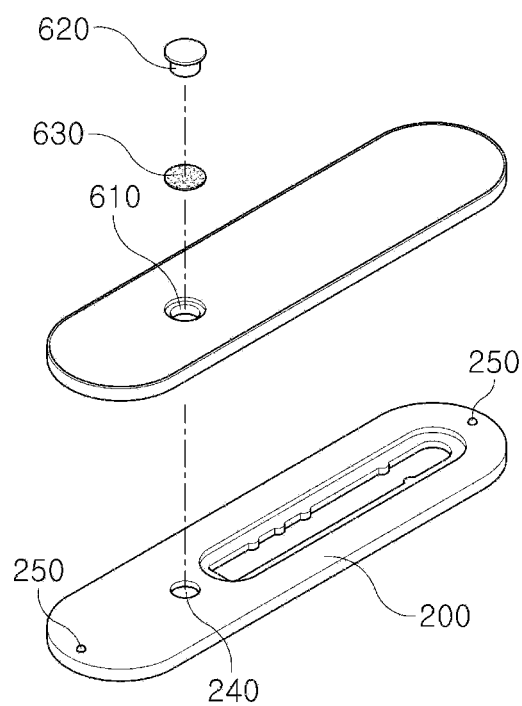
FIG. 8 is an exploded perspective view showing a guide sheet and a rotary sheet of a finger grip for a smart device according to a second embodiment of the present invention.
Figure 9:
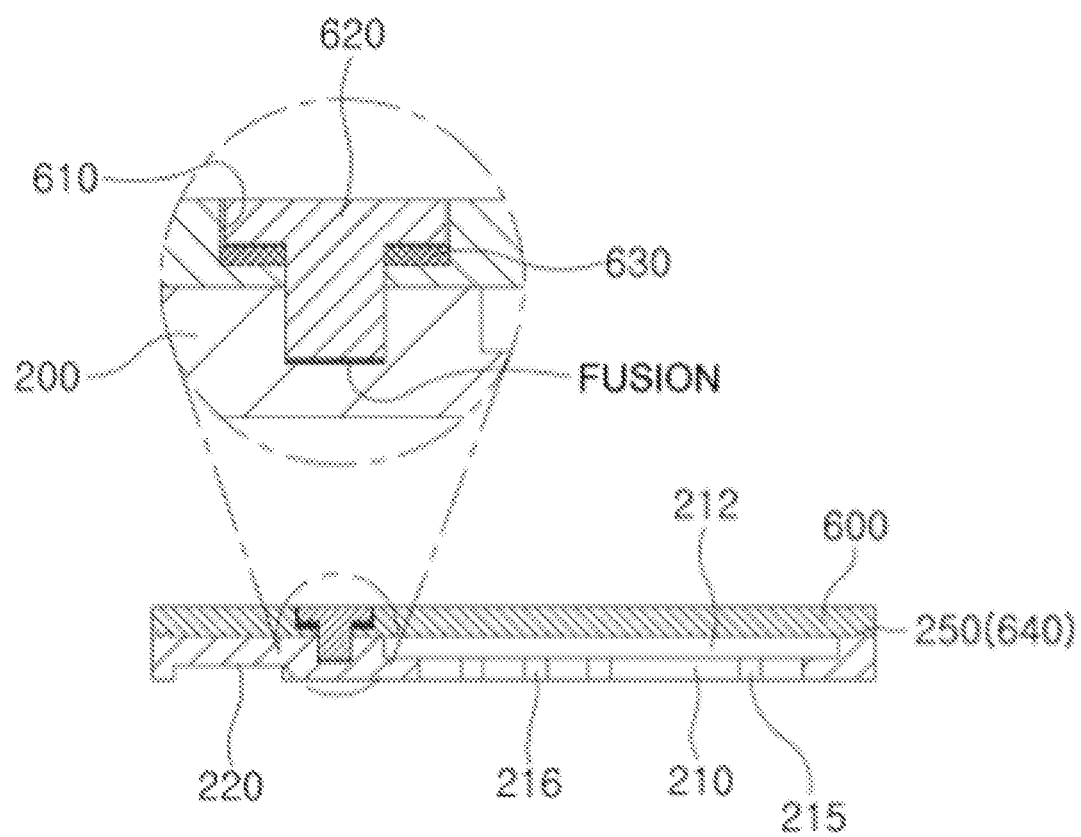
FIG. 9 is a schematic sectional views showing the guide sheet and the rotary sheet according to the second embodiment of the present invention.
Figure 10A:
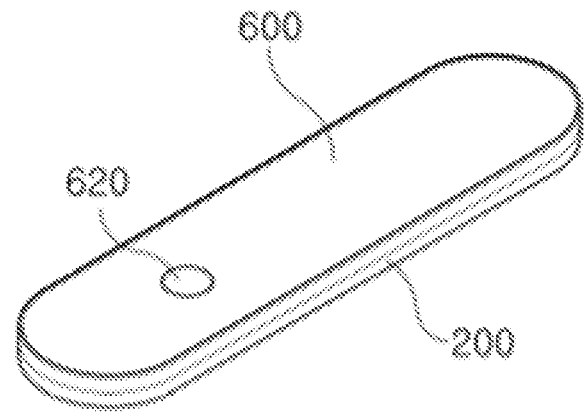
FIGS. 10a and 10b are perspective views showing the use states of the guide sheet and the rotary sheet according to the second embodiment of the present invention.
Figure 10B:
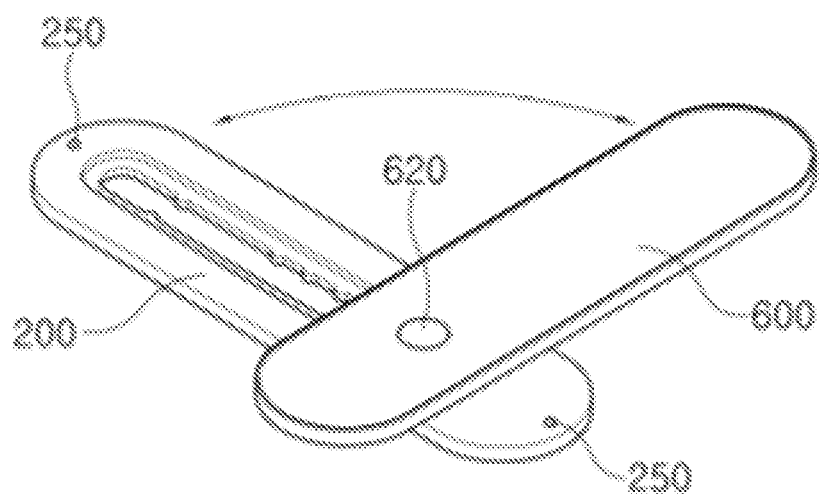
Figure 11:
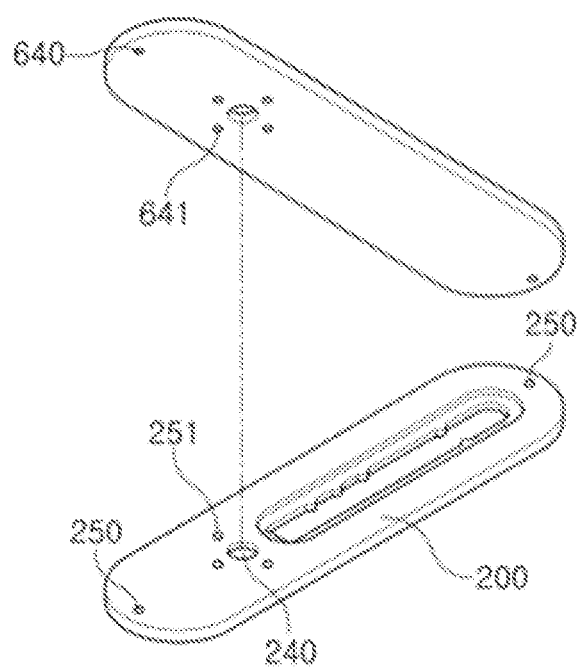
FIG. 11 is an exploded perspective view showing other examples of the guide sheet and the rotary sheet of the finger grip according to the second embodiment of the present invention present invention.
Figure 12:
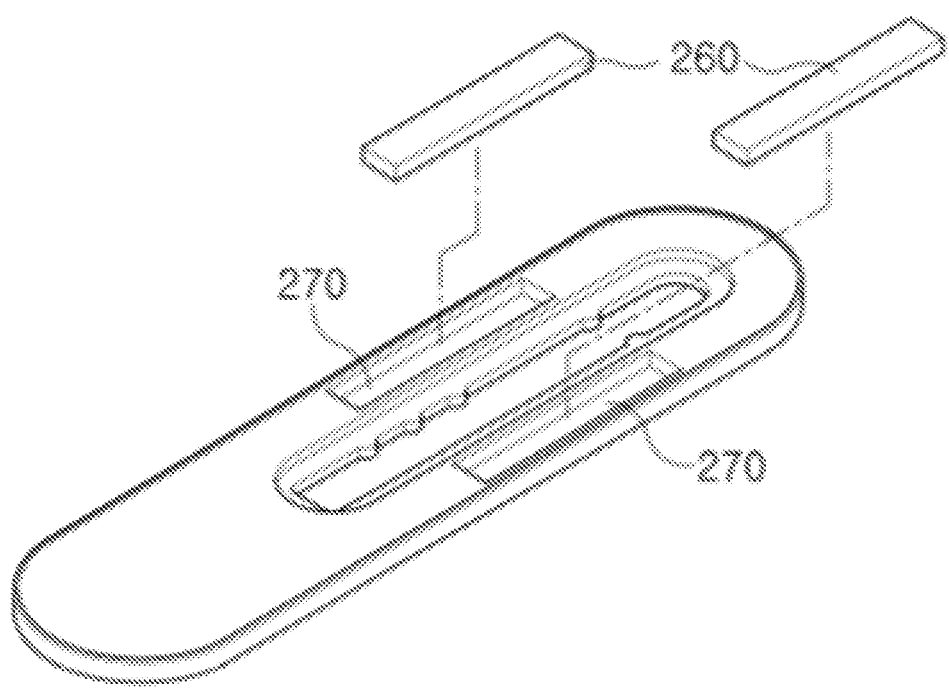
FIG. 12 is an exploded perspective view showing another example of the guide sheet according to the first embodiment of the present invention.

FIG. 1 is a perspective view showing a use state of a finger grip for a smart device according to a first embodiment of the present invention, FIG. 2 is an exploded perspective view showing the finger grip for a smart device according to the first embodiment of the present invention, FIG. 3 is a perspective view showing a guide sheet of the finger grip according to the first embodiment of the present invention, FIG. 4 is a perspective view showing an underside of the guide sheet of FIG. 3, FIG. 5 is a schematic sectional view showing the guide sheet according to the first embodiment of the present invention, FIG. 6 is a perspective view showing a variable sheet of the finger grip according to the first embodiment of the present invention, FIGS. 7a to 7c are schematic sectional views showing the use state of the finger grip according to the first embodiment of the present invention, FIG. 8 is an exploded perspective view showing a guide sheet and a rotary sheet of a finger grip for a smart device according to a second embodiment of the present invention, FIG. 9 is a schematic sectional views showing the guide sheet and the rotary sheet according to the second embodiment of the present invention, FIGS. 10a and 10b are perspective views showing the use states of the guide sheet and the rotary sheet according to the second embodiment of the present invention, FIG. 11 is an exploded perspective view showing other examples of the guide sheet and the rotary sheet of the finger grip according to the second embodiment of the present invention present invention, and FIG. 12 is an exploded perspective view showing another example of the guide sheet according to the first embodiment of the present invention.

As shown in FIGS. 1 and 2, a finger grip for a smart device 10 according to a first embodiment of the present invention largely includes a bonding sheet 100, a guide sheet 200, a variable sheet 300, a fixing rivet 400, and a printed film 500.

According to the first embodiment of the present invention, first, the bonding sheet 100 includes a bonding surface 110 attached to one side of an outer surface of the smart device 10, the bonding surface 110 having a punched portion 130 formed on one side of a top surface thereof, and a protection film 120 for protecting the bonding surface 110.

At this time, as shown in FIG. 1, the bonding sheet 100 is attached to an underside surface of the smart device 10, without having any interference with a part like a camera attachedly mounted on the smart device 10.

Further, the bonding sheet 100 desirably has a form of a silicone gel, but instead of the bonding sheet 100, of course, an adhesive, which does not give any harm to the human body, may be coated on the smart device 10. Otherwise, a separate bonding member like a double face tape may be provided. Various members may be freely adopted unless they are separated easily from the smart device 10 after attached thereto.

At this time, as shown in FIG. 2, the bonding sheet 100 desirably includes the punched portion 130 having the corresponding shape to a guide slot 210 formed on the guide sheet 200 as will be discussed later.

Through the formation of the punched portion 130, an area (the top surface of the bonding sheet 100 when viewed from FIG. 2) formed by attaching the bonding sheet 100 to the smart device 10 is the same as an area (the underside surface of the bonding sheet 100 when viewed from FIG. 2) formed by attaching the bonding sheet 100 to the guide sheet 200, so that it can provide a uniform bonding force to both surfaces of the bonding sheet 100, thereby achieving firm attachment.

Further, the punched portion 130 has the corresponding shape to the guide slot 210 of the guide sheet 200 and is adapted to prevent a head 410 of the fixing rivet 400 from being frictional with the bonding sheet 100 according to the movement of the variable sheet 300 and also to allow the head 410 of the fixing rivet 400 to be spaced apart from the smart device 10 by a thickness of the bonding sheet 100, so that the variable sheet 300 can be gently deformed.

If there is no punched portion 130 on the bonding sheet 100, for example, a separate structure has to be provided to prevent the bonding sheet 100 from coming into contact with the head 410 of the fixing rivet 400, which undesirably causes workability and productivity of the finger grip to be decreased, and further, the area formed by attaching the bonding sheet 100 to the smart device 10 is larger than the area formed by attaching the bonding sheet 100 to the guide sheet 200, so that since an external force generated from a user is applied to the relatively smaller area, the bonding sheet 100 is easily separated from the guide sheet 200. Therefore, it is desirable that the punched portion 130 is formed on the bonding sheet 100.

On the other hand, as shown in FIGS. 2 to 5, the guide sheet 200 is coupled to one side surface of the bonding sheet 100 and has the guide slot 210 formed on one side thereof and a coupling groove 220 formed on the other side thereof.

At this time, the guide sheet 200 is desirably made of ABS (acrylonitrile-butadiene-styrene) resin having excellent impact and heat resistance. Of course, the guide sheet 200 may be made of other synthetic resins or metals, but it is not limited particularly thereto.

The guide sheet 200 made of the ABS resin can prevent the smart device 10 from being damaged or deformed due to heating of the smart device 10 or impacts like drop of the smart device 10.

On the other hand, as shown in FIG. 6, the variable sheet 300 is laminated on one side surface of the guide sheet 200 and has a fusion portion 310 formed correspondingly to the coupling groove 220 and a slide pin 320 formed protrudingly therefrom in such a manner as to pass through the guide slot 210.

At this time, the variable sheet 300 is desirably made of a TPU (Thermoplastic Poly Urethane) material having excellent elasticity and strength, but it is not limited particularly thereto.

Further, the fixing rivet 400 is coupled to the slide pin 320 of the variable sheet 300 to prevent the slide pin 320 from escaping from the guide slot 210 and includes the head 410 seated onto an auxiliary groove 212 of the guide sheet 200 and a shaft 420 adapted to pass through the guide slot 210 in such a manner as to be coupled to the slide pin 320 of the variable sheet 300.

Furthermore, the printed film 500 is coupled to one side surface of the variable sheet 300 and is made of a transparent or semi-transparent material, while having various logos or patterns printed on the outer surface thereof.

On the other hand, an explanation on operations of the guide sheet 200 and the variable sheet 300 of the finger grip according to the first embodiment of the present invention will be given with reference to FIGS. 7a to 7c.

First, the guide slot 210 of the guide sheet 200 is adapted to reciprocatedly move the slide pin 320 of the variable sheet 300 therealong and includes at least one or more protruding portions 211 protruding inwardly therefrom to fix the slide pin 320 in position thereto and the auxiliary groove 212 adapted to seat the head 410 of the fixing rivet 400 thereonto to prevent the head 410 from protruding outwardly therefrom.

In this case, desirably, an inner diameter of the guide slot 210 is equal to or larger than an outer diameter of the shaft 420 coupled to the slide pin 320, so that the slide pin 320 can slide inside the guide slot 210.

Further, desirably, an inner diameter of the auxiliary groove 212 is equal to or larger than an outer diameter of the head 410 coupled to the slide pin 320.

At this time, the protruding portions 211 include first protrusions 215 formed on the outside of the guide slot 210 with respect to the center of the guide sheet 200 in such a manner as to be symmetrical to each other on both sides of the inner peripheral surface of the guide slot 210 to allow the variable sheet 300 to be kept in the state of coming into close contact with the guide sheet 200.

In detail, as shown in FIG. 7a, the first protrusions 215 are formed to face each other on both sides of the inner peripheral surface of the guide slot 210 to prevent the variable sheet 300 from arbitrarily sliding along the guide slot 210, so that the slide pin 320 can pass through the guide slot 210 only when a relatively large force is applied from a user to the variable sheet 300.

Further, the protruding portions 211 include a plurality of second protrusions 216 spaced apart from each other by a given distance on one side of the inner peripheral surface of the guide slot 210 in the opposite direction to the first protrusions 215 to allow the variable sheet 300 to be kept spaced apart from the guide sheet 200, while the spaced distance is being step by step adjusted.

In detail, as shown in FIGS. 7b and 7c, the second protrusions 216 are formed only on one side of the inner peripheral surface of the guide slot 210 to allow the variable sheet 300 to be adjusted in deformation, so that the slide pin 320 can pass through the guide slot 210 even when a relatively small force is applied from the user to the variable sheet 300.

Through the formation of the protruding portions 211, like this, the variable sheet 300 is deformable according to various finger thicknesses of users, and if the smart device 10 is mounted on an arbitrary place, a mounting angle of the smart device 10 can be adjusted by means of the variable sheet 300.

Also, as shown in FIG. 7a, the coupling groove 220 of the guide sheet 200 includes a concave-convex portion 221 formed on the surface thereof so that it can be firmly fixed to the fusion portion 310. Further, a concave-convex portion 311 is formed on the surface of the fusion portion 310.

At this time, the concave-convex portions have surface roughness in a range of Ra 3 to 10, and desirably, surface roughness of Ra 5.

In this case, if the surface roughness is less than Ra 3, a bonding force may be decreased upon heat fusion as will be discussed later, and contrarily, if the surface roughness is more than Ra 10, gaps (pores) may occur on a portion where the fusion portion 310 and the coupling groove 220 are brought into contact with each other, thereby causing a bonding force to be deteriorated.

Otherwise, the coupling groove 220 may have the same shape as the slide pin 320 and the fixing rivet 400, which of course helps the variable sheet 300 and the guide sheet 200 firmly fixed to each other.

Also, as shown in FIG. 5, the guide sheet 200 further includes a prevention projection 230 formed along the outer peripheral surface coupled to the bonding sheet 100.

At this time, the prevention projection 230 is adapted to prevent foreign matters like dust introduced from the outside by means of the bonding force of the bonding sheet 100 from sticking to the finger grip, thereby avoiding the contamination of the finger grip. Desirably, the bonding sheet 100 is accommodated inside the prevention projection 230.

Moreover, the bonding sheet 100, the guide sheet 200, the variable sheet 300, and the fixing rivet 400 are coupled to one another by means of any one selected from heat fusion, ultrasonic fusion, and bonding.

Accordingly, they are bonded by means of the heat fusion, without any separate adhesive, so that they do not give any harm to the human body, bonding forces among the parts are improved to minimize damage or deformation of a product, and their manufacturing process is simplified to improve productivity and economical effects.

On the other hand, an explanation on a finger grip for a smart device according to a second embodiment of the present invention will be given with reference to FIGS. 8 to 10b.

First, as shown in FIGS. 8 and 9, the finger grip according to the second embodiment of the present invention further includes a rotary sheet 600 adapted to allow the guide sheet 200 to be rotatable.

At this time, the guide sheet 200 has a fixing groove 240 formed on one side of the outer surface thereof and seating protrusions 250 formed on both side end portions thereof in a longitudinal direction thereof.

Further, the rotary sheet 600 has a rotary hole 610 formed on one side of the outer surface thereof in such a manner as to correspond to the fixing groove 240, a shaft screw 620 adapted to pass through the rotary hole 610 in such a manner as to be thus fixed to the fixing groove 240 on one side end thereof, an elastic pad 630 adapted to allow the shaft screw 620 to be moveable up and down inside the rotary hole 610, and seating grooves 640, as will be discussed later, formed on an inner surface thereof in such a manner as to correspond to the seating protrusions 250.

On the other hand, FIG. 10a shows a state where the guide sheet 200 and the rotary sheet 600 are laminated to each other in parallel to each other by means of coupling between the seating protrusions 250 of the guide sheet 200 and the seating groves 640 of the rotary sheet 600, and FIG. 10b shows a state where the guide sheet 200 rotates around the shaft screw 620 of the rotary sheet 600.

Now, the operations of the guide sheet 200 and the rotary sheet 600 according to the second embodiment of the present invention will be explained.

In this case, in the state where the guide sheet 200 is held by the user, the user's force is applied to a downward direction (with respect to FIG. 10a) to pull the guide sheet 200.

After that, the shaft screw 620 moves downward inside the rotary hole 610 by means of the elastic pad 630, and accordingly, the seating protrusions 250 are separated from the seating grooves 640 to allow the guide sheet 200 to rotate.

Next, if the guide sheet 200 is released from the user's hand, it moves to an upward direction by means of the elastic restoring force of the elastic pad 630, thereby finishing the rotation of the guide sheet 200.

At this time, as shown in FIG. 11, the guide sheet 200 has at least one or more auxiliary protrusions 251 formed along an outer circumstance of the fixing groove 240 to allow the rotating state of the guide sheet 200 to be easily maintained, and the rotary sheet 600 has at least one or more auxiliary grooves 641 formed along an outer circumstance of the rotary hole 610 in such a manner as to correspond to the auxiliary protrusions 251.

On the other hand, as shown in FIG. 12, the guide sheet 200 further includes at least one or more fixing members 260 made of a magnetic material so that the smart device 10 can be attached to a given position.

At this time, the fixing members 260 are desirably made of a magnetic material like a metal or magnet to allow the smart device 10 to be freely mounted on a given position, and further, the guide sheet 200 has accommodation slots 270 formed on the surface thereof to accommodate the fixing members 260 therein.

Further, for example, the given position may be a ventilation hole or a dashboard in a vehicle, and also, a separate holder in which magnets are built may be provided on the given position so as to achieve firm attachment.

Through the arrangement of the fixing members 260, the smart device 10 can be easily attached to arbitrary positions, without any restriction in places.

As described above, the finger grip for the smart device according to the present invention can more stably hold the smart device through the variable sheet fitted to the user's finger and also can adjust the variable sheet's size by means of the plurality of protrusions formed on the guide sheet according to the user's finger thickness.

In addition, the finger grip for the smart device according to the present invention can be made by means of the heat fusion, without any separate adhesive, so that the finger grip does not give any harm to the human body, bonding forces among the components are improved to minimize damage or deformation of a product, and a manufacturing process is simplified to improve productivity and economical effects.

Further, the finger grip for the smart device according to the present invention can maintain the fixed state of the variable sheet by means of the protrusion portions to allow the smart device to be mounted on an arbitrary place and also can adjust the angle of the smart device mounted on the arbitrary place through the adjustment of the variable sheet.

Additionally, the finger grip for the smart device according to the present invention can rotate the guide sheet so that in the state where the smart device is held by the user, the smart device can rotate freely.

The present invention has been described with reference to the particular illustrative embodiments. In this case, terms used in this application are used to only describe specific exemplary embodiments and are not intended to restrict the present invention. Accordingly, persons skilled in the relevant art can appreciate that many modifications and variations are possible in light of the above teachings. It is therefore intended that the scope of the invention be limited not by this detailed description, but rather by the claims appended hereto.

What is claimed is:

1. A finger grip for a smart device, comprising:
   a bonding sheet having a bonding surface with a punched portion formed on one side of a top surface thereof, and a protection film for protecting the bonding surface;
   a guide sheet coupled to one side surface of the bonding sheet and having a guide slot formed on one side thereof and a coupling groove formed on the other side thereof;
   a variable sheet laminated on one side surface of the guide sheet and having a fusion portion formed correspondingly to the coupling groove and a slide pin formed protrudingly therefrom to pass through the guide slot;
   wherein the guide slot of the guide sheet comprises at least one or more protruding portions protruding inwardly therefrom to fix the slide pin in position thereto, while the slide pin is reciprocatedly moving therealong, the protruding portions having first protrusions formed on the outside of the guide slot in such a manner as to be symmetrical to each other on both sides of the inner peripheral surface of the guide slot to allow the variable sheet to be kept in the state of coming into close contact with the guide sheet.

2. The finger grip according to claim 1, wherein the coupling groove comprises a concave-convex portion formed on the surface thereof so that the coupling groove is firmly fixed to the fusion portion.

3. The finger grip according to claim 1, wherein the bonding sheet, the guide sheet, and the variable sheet are coupled to one another by means of any one selected from heat fusion, ultrasonic fusion, and bonding.

4. The finger grip according to claim 1, wherein the guide sheet comprises at least one or more fixing members made of a magnetic material so that the smart device is attached to a predetermined position.

\* \* \* \* \*